United States Patent
Özüduru et al.

(10) Patent No.: US 11,007,824 B2
(45) Date of Patent: May 18, 2021

(54) PNEUMATIC VEHICLE TIRE

(71) Applicant: Continental Reifen Deutschland GmbH, Hannover (DE)

(72) Inventors: Ahmet Özüduru, Hannover (DE); Ralf Schütte, Seelze (DE); Bernhard Roeger, Aachen (DE)

(73) Assignee: Continental Reifen Deutschland GmbH, Hannover (DE)

(*) Notice: Subject to any disclaimer, the term of this patent is extended or adjusted under 35 U.S.C. 154(b) by 20 days.

(21) Appl. No.: 16/980,861

(22) PCT Filed: Jan. 10, 2019

(86) PCT No.: PCT/EP2019/050514
§ 371 (c)(1),
(2) Date: Sep. 15, 2020

(87) PCT Pub. No.: WO2019/174794
PCT Pub. Date: Sep. 19, 2019

(65) Prior Publication Data
US 2021/0008929 A1    Jan. 14, 2021

(30) Foreign Application Priority Data
Mar. 15, 2018   (DE) .................... 10 2018 203 963.1

(51) Int. Cl.
*B60C 11/13*   (2006.01)
*B60C 11/03*   (2006.01)

(52) U.S. Cl.
CPC ...... *B60C 11/1323* (2013.01); *B60C 11/1353* (2013.01); *B60C 2011/0353* (2013.01);
(Continued)

(58) Field of Classification Search
CPC ............. B60C 11/1323; B60C 11/1353; B60C 2011/0353; B60C 2011/0355;
(Continued)

(56) References Cited

U.S. PATENT DOCUMENTS

2005/0230020 A1*  10/2005  Miyake .................. B60C 11/12
                                                      152/209.19
2010/0252159 A1   10/2010  Mukai
(Continued)

FOREIGN PATENT DOCUMENTS

DE    102015202613 A1    8/2016
DE    102016213334 A1    1/2018
(Continued)

OTHER PUBLICATIONS

English machine translation of JP2000-158916. (Year: 2000).*
(Continued)

*Primary Examiner* — Robert C Dye
(74) *Attorney, Agent, or Firm* — David L. Cate; Gregory Adams

(57) ABSTRACT

A pneumatic vehicle tire with a tread comprising circumferential grooves (2) and at least one profile rib (1), which runs around in the circumferential direction and formed in which there are grooves (4) which at a groove flank (5) of a circumferential groove (2) that delimits the profile rib (1) open into it, wherein the groove flanks (5) of the circumferential groove (2) run at an angle ($\beta$) of 12° to 17° to the radial direction, thereby widening the circumferential groove (2) in the direction of the periphery of the tread. The grooves (4) run at an angle ($\alpha$) of 45°±20° to the axial direction, end within the profile rib (1), have a maximum depth ($t_2$) of 3.5 mm and open in each case into a local indentation (7), which is formed at the groove flank (5), reaches up to the periphery of the tread, is concavely
(Continued)

Figure 1:
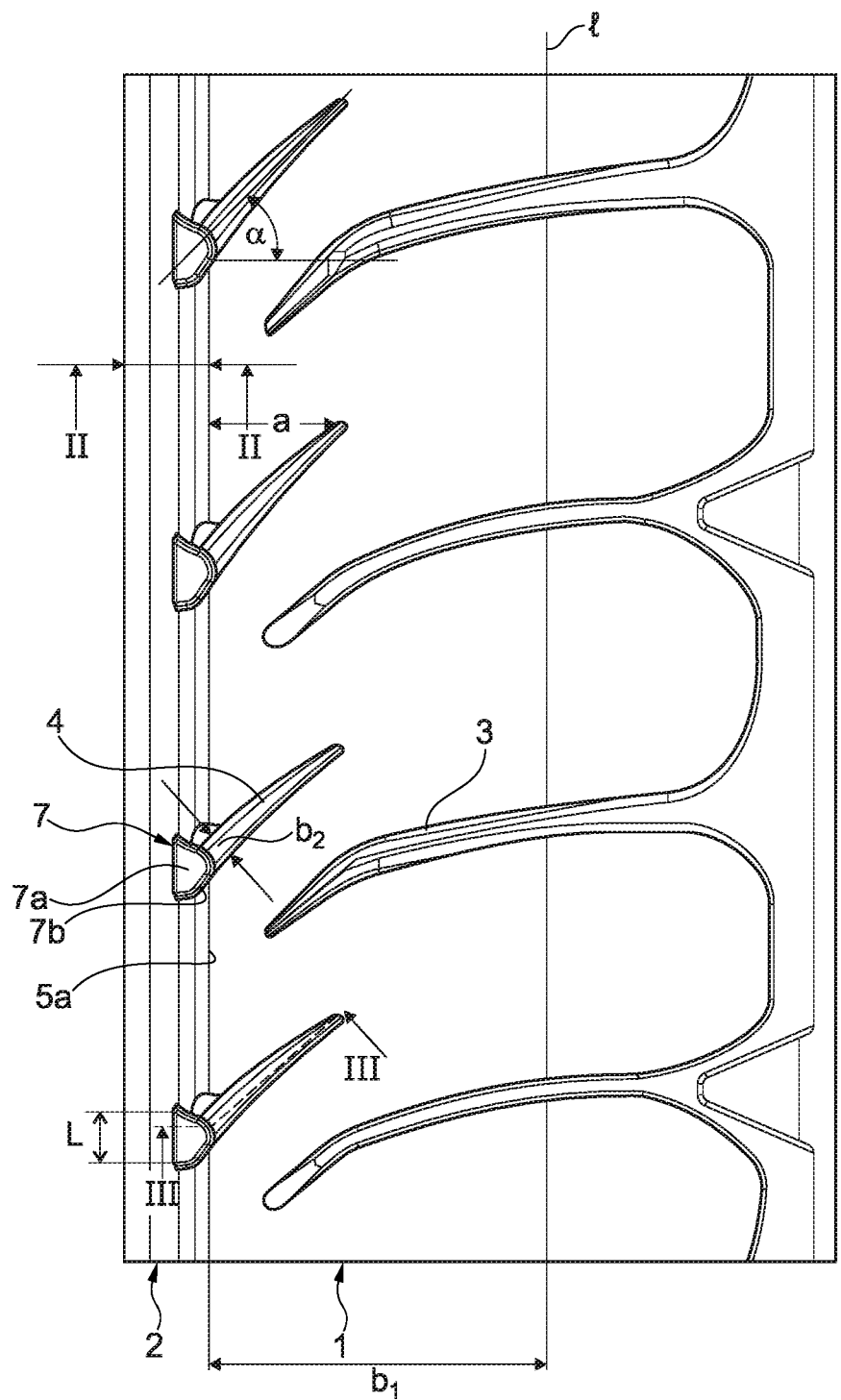

rounded along the groove flank (5) and has a bottom (7a) that runs in particular parallel to the periphery of the tread and is at a distance (c), determined in the radial direction, of 0.5 mm to 2.0 mm from the deepest point of the groove (6) of the circumferential groove (2).

12 Claims, 2 Drawing Sheets

(52) U.S. Cl.
CPC .................. *B60C 2011/0355* (2013.01); *B60C 2011/0381* (2013.01); *B60C 2011/133* (2013.01); *B60C 2011/1361* (2013.01)

(58) Field of Classification Search
CPC ....... B60C 2011/0381; B60C 2011/133; B60C 2011/1361
See application file for complete search history.

(56) References Cited

U.S. PATENT DOCUMENTS

| | | |
|---|---|---|
| 2016/0193886 A1 | 7/2016 | Iwasaki |
| 2019/0275844 A1 | 9/2019 | Rittweger |

FOREIGN PATENT DOCUMENTS

| | | | |
|---|---|---|---|
| EP | 2239153 A1 | | 10/2010 |
| EP | 2489526 A2 | | 8/2012 |
| EP | 3037282 A1 | | 6/2016 |
| JP | H02169306 A | | 6/1990 |
| JP | 2000-158916 | * | 6/2000 |
| JP | 2006232012 A | | 9/2006 |
| JP | 2011-084186 | * | 4/2011 |
| JP | 2015221650 A | | 12/2015 |
| WO | 2016128085 A1 | | 8/2016 |

OTHER PUBLICATIONS

English machine translation of JP2011-084186 (Year: 2011).*
International Search Report of international application PCT/EP2019/050514.

* cited by examiner

PNEUMATIC VEHICLE TIRE

The invention relates to a pneumatic vehicle tire with a tread comprising circumferential grooves and at least one profile rib, which runs around in the circumferential direction and formed in which there are grooves which at one of the groove flanks of a circumferential groove that laterally delimits the profile rib open into it, wherein the groove flanks of the circumferential groove run at an angle of 12° to 17° to the radial direction, thereby widening the circumferential groove in the direction of the periphery of the tread.

A pneumatic vehicle tire with a tread of this kind is known from EP 2 239 153 A1. The tread has a number of profile ribs separated from one another by circumferential grooves. On the shoulder side, the profile ribs provided are traversed by transverse grooves which open by means of a short portion having a reduced depth into the circumferential groove delimiting the profile rib on the inside of the tread in order to impart better stability to the profile rib. The pneumatic vehicle tire known from EP 3 037 282 A1 has a tread of similar configuration.

DE 10 2015 202 613 A1 discloses a pneumatic vehicle tire having a tread in which the shoulder-side profile ribs have transverse grooves of sipe-like design which run in an arc shape in the direction of the circumferential groove and are widened at the periphery of the tread by a chamfer which is in each case formed on the groove flank running on the inside of the arc. The narrow, sipe-like configuration of the transverse grooves and the arc shape with the chamfer along the transverse groove edge on the inside of the arc ensure a low rolling noise and assist the drainage of water into the circumferential groove on a wet surface.

For the handling characteristics of tires, it is important that certain profile ribs have a higher stiffness than other profile ribs, depending on the position in the tread. This applies, for example, to profile ribs running on the shoulder side, which are supposed to have a relatively high stiffness in order to ensure a good side force buildup. In order to maintain higher stiffness of a profile rib, the negative component in this profile rib is kept small. However, the small negative component is disadvantageous for water drainage in the transverse direction of the tread. To ensure water drainage, profile ribs arranged on the shoulder side therefore generally have narrow grooves or sipes, which are oriented in a transverse direction, but this reduces the stiffness of the profile ribs and also gives rise to deficits in terms of the rolling noise in the 1000 Hz range. In this regard, the depth and width of the sipes or narrow grooves also plays a certain role. It is customary in profile ribs to make a compromise in terms of the configuration with sipes and/or narrow grooves, such that either the stiffness and rolling noise or the drainage capacity are at the desired level.

It is the underlying object of the invention to improve a pneumatic vehicle tire of the type stated at the outset in such a way that the stated conflict of aims between stiffness and noise reduction, on the one hand, and the water drainage capacity, on the other hand, is resolved in a significantly better way than before.

According to the invention, the stated object is achieved by virtue of the fact that the grooves run at an angle of 45°±20° to the axial direction, end within the profile rib, have a maximum depth of 3.5 mm and open in each case into a local indentation, which is formed at the groove flank, reaches up to the periphery of the tread, is concavely rounded along the groove flank and has a bottom that runs in particular parallel to the periphery of the tread and is at a distance, determined in the radial direction, of 0.5 mm to 2.0 mm from the deepest point of the groove base of the circumferential groove.

The shallow depth of the grooves is particularly favorable for high stiffness of the profile rib. Since the grooves in each case open into an indentation of rounded configuration which is formed on the groove flank of the circumferential groove, the outflow path into the circumferential groove is shortened, thereby enabling improved and accelerated water drainage out of the grooves into the circumferential groove to take place. Here, the round configuration of the indentations avoids the formation of unfavorable water eddy currents. The shallow depth of the grooves and the relatively steep inclination with respect to the axial direction ensures a largely "closed" profile rib, thereby reducing noise emissions by the tire to the outside in the 1000 Hz range.

Configurations of indentations which widen in the direction of the circumferential groove are particularly advantageous for as far as possible unhindered outflow of water from the grooves into the circumferential groove. In a preferred embodiment, therefore, the indentations and the bottom thereof have a shape similar to a D in a plan view of the tread. Also particularly advantageous is a configuration in which the indentation and the bottom thereof have a shape similar to a circular segment in a plan view of the tread, wherein the circular segment is at most a semicircle.

The concavely rounded boundary wall of the indentation, said wall running between the bottom and the periphery of the tread, is furthermore preferably inclined at an angle of 2° to 5° with respect to the radial direction. Overall, this inclination imparts to the indentation a shape similar to a funnel, which likewise assists the drainage of water from the grooves into the circumferential groove.

The regions of entry of the grooves are preferably situated in those regions of the indentations which are furthest toward the inside of the groove flanks, thus enabling the aforementioned advantageous effects of the indentations on water drainage to come fully into play.

As far as possible, the indentations on the groove flanks should have no structural effects on the profile rib, particularly on the stability thereof. It is therefore preferable if, at the periphery of the tread, that point of the indentations which is situated furthest toward the inside is at the level of the remaining peripheral edge of the groove flank of the circumferential groove or up to 2 mm inside the profile rib relative to the position of the remaining peripheral edge of the groove flank.

Particularly balanced properties in respect of stiffness, noise reduction and water drainage capacity of the grooves are promoted by preferred configurations of the grooves. In this respect, it is particularly advantageous for example, if the grooves have a U-shaped or V shaped cross section and furthermore if the grooves have a depth of at least 1.5 mm and have a maximum width of 2.0 mm to 5.0 mm at the periphery of the tread. There is also a particular preference in this context for a configuration in which the grooves have a width and a depth which increase continuously, starting at their ends in the profile rib, in the direction of their regions of entry into the indentations.

It is furthermore advantageous for an additional improvement in water drainage if the end of the grooves which is situated in the profile rib is adjoined in each case by a sipe. It is possible, for example, for such sipes to open into a circumferential groove which delimits the profile rib on the second side thereof, or, if the profile rib is a profile rib running on the shoulder side, they can run beyond the ground contact surface of the tread.

There is a particular preference for the configuration according to the invention in profile ribs which are profile ribs running on the shoulder side since such ribs should have a particularly high stiffness to ensure a good side force buildup during cornering.

Further features, advantages and details of the invention will now be described in more detail on the basis of the drawing, which illustrates an exemplary embodiment. In the drawing, FIG. 1 shows a plan view of a circumferential portion in the shoulder-side region of a tread of a pneumatic vehicle tire, FIG. 2 shows a sectional illustration along the line II-II of FIG. 1, and FIG. 3 shows a sectional illustration along the line III-III of FIG. 1.

Pneumatic vehicle tires designed in accordance with the invention are, in particular, pneumatic vehicle tires of the radial type for passenger cars, vans and light trucks.

Figure 2:
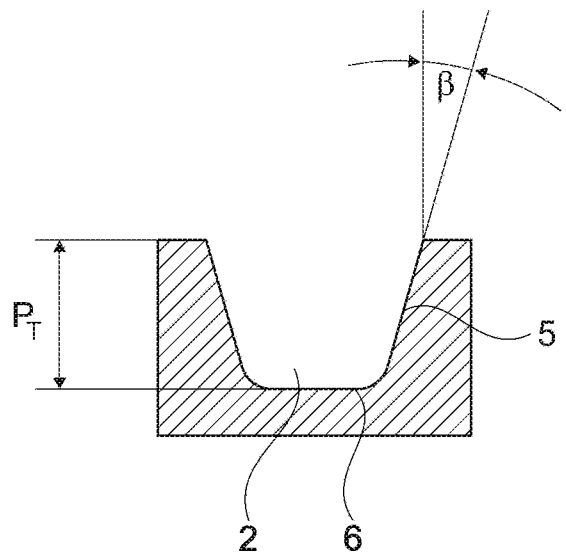
Figure 3:
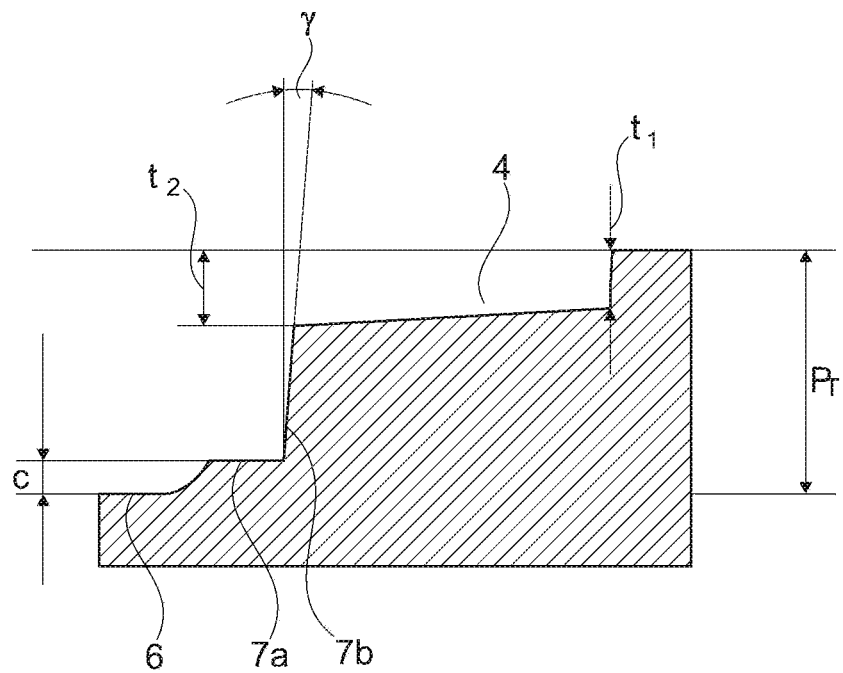

FIG. 1 shows a plan view—a development in the plane— of a shoulder-side region of a tread having a shoulder-side profile rib 1 and a circumferential groove 2 delimiting said rib on the inside of the tread, which groove, as the sectional illustration in FIG. 2 shows, has a depth $P_T$ which corresponds to the profile depth provided for the respective tire. The dashed line 1 in FIG. 1 symbolizes one lateral edge of the ground contact surface of the tire. In the embodiment shown, the circumferential groove 2 runs straight in the circumferential direction but, as is conventional with circumferential grooves, can also have a zigzag or undulating shape. The profiled tread regions adjoining the circumferential groove 2 on the inside of the tread are not illustrated and can comprise further profile ribs, profile block rows, circumferential grooves and the like.

In the example illustrated, transverse grooves 3 are formed in the profile rib 1, and these end on the inside of the tread, within the profile rib 1, at a distance of, in particular, 3.0 mm to 7.0 mm before the circumferential groove 2, and run at an angle ≤45° to the axial direction and otherwise, in a known manner, beyond the ground contact surface of the tread. In the circumferential direction, one transverse groove 3 alternates in each case with one groove 4, which opens into the circumferential groove 2 and which ends within the profile rib 1 at a distance a from the circumferential groove 2 that corresponds to 25% to 50% of the width $b_1$ of the profile rib 1. In the case of circumferential grooves 2 which deviate from the straight shape, having a zigzag shape for example, $b_1$ is the maximum width of the profile rib 1. The grooves 4 run at an angle α of 45°+/−20° relative to the axial direction and have an inclination relative to the axial direction which coincides with that of the transverse grooves 3. The grooves 4 run substantially parallel to one another, that is to say that the angles α within a tread may differ from one another by up to 10°. Over its extent, each groove 4 has a depth which, starting with its closed end, increases continuously in the direction of the region of entry into the circumferential groove 2, wherein the groove 4 has, at its end region in the profile rib 1, a depth $t_1$ of at least 1.5 mm, and, in its region of entry into the circumferential groove 2, a depth $t_2$ which is at most 3.5 mm and, in particular, 10% to 20% greater than the depth $t_1$. The cross section of the groove 4 is V-shaped or U-shaped, and, starting at its end in the profile rib 1, its width $b_2$ increases in the direction of the region of entry into the circumferential groove 2 and is 2.5 mm to 5.0 mm in the region of entry.

As the sectional illustration in FIG. 2 shows, the circumferential groove 2 has, outside the region of entry of grooves, a cross section with a groove base 6 and two groove flanks 5, which are inclined at an angle β of 12° to 17°, in particular 15°, with respect to the radial direction, wherein the inclination is such that the width of the circumferential groove 2 increases in the direction of the periphery of the tread. The two groove flanks 5 merge into the groove base 6 via rounded transitions. The groove base 6 and the groove flanks 5 impart a substantially trough-shaped cross section to the circumferential groove 2.

The grooves 4 open into the circumferential groove 2 at local indentations 7 of the one groove flank 5. Each indentation 7 has a shape similar to a D in a plan view of the tread, with a bottom 7a similar to a D in plan view and a boundary wall 7b which runs along the groove flank 5, is rounded overall and, as FIG. 3 shows, is inclined at an angle γ of 2° to 5° with respect to the radial direction, with the result that the indentation 7 widens somewhat in the direction of the periphery of the tread. In this case, the grooves 4 open into those regions of the indentations 7 which are furthest toward the inside of the groove flank.

The bottom 7a of each indentation 7 runs parallel to the periphery of the tread, is at a somewhat raised level relative to the groove base 6 and is at a radial distance c of 0.5 mm to 2.0 mm to the deepest point of the groove base 6. The straight edge of the bottom 7a extends parallel to the peripheral edge of the circumferential groove at the periphery of the tread and has a length L of 3.0 mm to 7.0 mm. At the periphery of the tread, the indentation 7 ends at the peripheral edge 5a of the groove flank 5 or projects by up to 2.0 mm into the profile rib 1.

In plan view, it is also possible for the indentations 7 to have some other rounded shape, e.g. the shape of a circular segment, at most that of a semicircle.

The grooves 4 can be chamfered in a known manner along at least one edge, preferably along both edges at the periphery of the tread. In the profile rib 1, the grooves 4 can each be directly adjoined by a narrow sipe (not illustrated) with a width of about 0.4 mm to 1.0 mm, which preferably runs substantially parallel to the transverse grooves 3 and runs beyond the ground contact surface and the tread edge 1.

The edge region of the indentation 7 at the periphery of the tread can be rounded with a small radius or provided with a chamfer.

The indentations 7 on the groove flank 5 of the circumferential groove 2 shorten the outflow path for water, and therefore treads according to the invention have improved water drainage, wherein the round shape of the indentations 7 assists the drainage effect. By virtue of the shallow depth of the grooves 4, the profile rib 1 on the shoulder side remains largely "continuous", as a result of which the noise emissions of the tire in terms of tire/road noise in the 1000 Hz range are low. The extent of the grooves 4 relative to the axial direction at an angle of 45°+/−20° likewise contributes to a reduction in noise emissions to the outside.

LIST OF REFERENCE SIGNS

1 . . . Profile rib
2 . . . Circumferential channel
3 . . . Transverse groove
4 . . . Groove
5 . . . Groove flank
6 . . . Groove base
7 . . . Indentation
7a . . . Bottom
7b . . . Bounding wall
α, β, γ . . . Angles a, c ... Distance
$b_1, b_2$ ... Width
1 ... Line
L ... L Length
$P_T$ ... Profile depth
$t_2$ ... Depth

The invention claimed is:

1. A pneumatic vehicle tire with a tread comprising circumferential grooves and at least one profile rib which runs around in a circumferential direction, and formed in the at least one profile rib are grooves which at a groove flank of a circumferential groove delimits the profile rib, wherein groove flanks of the circumferential groove run at an angle ($\beta$) of 12° to 17° relative a radial direction, thereby widening the circumferential groove in the direction of a periphery of the tread;
   wherein the grooves run at an angle ($\alpha$) of 45°±20° relative an axial direction and end within the profile rib;
   wherein the grooves have a maximum depth ($t_2$) of 3.5 mm and open in each case into an indentation which is formed at the groove flank and reaches up to the periphery of the tread;
   wherein the indentation is concavely rounded along the groove flank, has a bottom that runs parallel to the periphery of the tread, and is at a distance (c), determined in the radial direction, of from 0.5 mm to 2.0 mm from the deepest point of a groove base of the circumferential groove; and,
   wherein the concavely rounded boundary wall of the indentation, running between the bottom and the periphery of the tread, is inclined at an angle ($\gamma$) of from 2° to 5° with respect to the radial direction.

2. The pneumatic vehicle tire as claimed in claim 1, wherein the indentation and the bottom of the indentation have a shape of a D in a plan view of the tread.

3. The pneumatic vehicle tire as claimed in claim 1, wherein the indentation and the bottom of the indentation have a shape of a circular segment in a plan view of the tread, and wherein the shape is at most a semicircle.

4. The pneumatic vehicle tire as claimed in claim 1, wherein the grooves open into those regions of indentations which are furthest toward the inside of a groove flank.

5. The pneumatic vehicle tire as claimed in claim 1, wherein at the periphery of the tread, a point of the indentation which is situated in the axial direction furthest toward an inside of the groove flank is at the level of a peripheral edge of the groove flank.

6. The pneumatic vehicle tire as claimed in claim 1, wherein a point of the indentation which is situated in the axial direction furthest toward an inside of the profile rib is situated up to 2.0 mm inside the profile rib relative to the position of a peripheral edge of the groove flank outside the indentation.

7. The pneumatic vehicle tire as claimed in claim 1, wherein the grooves have a U-shaped or V-shaped cross section.

8. The pneumatic vehicle tire as claimed in claim 1, wherein the grooves have a depth ($t_1$) of at least 1.5 mm.

9. The pneumatic vehicle tire as claimed in claim 1, wherein the grooves have a maximum width ($b_2$) of 2.0 mm to 5.0 mm at the periphery of the tread.

10. The pneumatic vehicle tire as claimed in claim 1, wherein the grooves have a width and a depth which increase continuously, starting at their ends in the profile rib and in the direction of their regions of entry into the indentations.

11. The pneumatic vehicle tire as claimed in claim 1, wherein the ends of the grooves, which are situated in the profile rib, are adjoined in each case by a sipe.

12. The pneumatic vehicle tire as claimed in claim 1, wherein the profile rib is a profile rib running on a shoulder side of the pneumatic tire.

\* \* \* \* \*